(12) United States Patent
Furmidge et al.

(10) Patent No.: US 6,952,970 B1
(45) Date of Patent: Oct. 11, 2005

(54) MODULAR UTILITY METER

(75) Inventors: Neil Furmidge, Sheffield (GB); Stuart Hallows, Chesterfield (GB); Mark Fairman, Bath (GB)

(73) Assignee: Fusion Meters Limited, Birmingham (GB)

( * ) Notice: Subject to any disclaimer, the term of this patent is extended or adjusted under 35 U.S.C. 154(b) by 0 days.

(21) Appl. No.: 09/979,799

(22) PCT Filed: May 26, 2000

(86) PCT No.: PCT/GB00/02040

§ 371 (c)(1),
(2), (4) Date: Mar. 11, 2002

(87) PCT Pub. No.: WO00/73743

PCT Pub. Date: Dec. 7, 2000

(30) Foreign Application Priority Data

May 28, 1999 (GB) .............................. 9912561

(51) Int. Cl.[7] .............................. G01F 1/20
(52) U.S. Cl. ...................... 73/861.19; 73/273
(58) Field of Search ............... 73/861.19, 273, 73/861.88, 861.93

(56) References Cited

U.S. PATENT DOCUMENTS 4,306,457 A * 12/1981 Fukui et al. ............. 73/861.77
5,675,092 A * 10/1997 Denis ...................... 73/861.78

FOREIGN PATENT DOCUMENTS

| | | | |
|---|---|---|---|
| DE | 19 632 557 | 2/1998 | |
| FR | 2640747 | * 6/1990 | ........... G01F/15/06 |
| GB | 2 116 720 | 9/1983 | |
| GB | 2 171 205 | 8/1986 | |
| GB | 2 189 323 | 10/1987 | |
| GB | 0 254 843 | 2/1988 | |
| GB | WO 97/22854 | * 6/1997 | ............. G01F/1/32 |

* cited by examiner

*Primary Examiner*—Harshad Patel
(74) *Attorney, Agent, or Firm*—McKenna Long & Aldridge LLP.

(57) ABSTRACT

A modular utility meter (1), for example, a water meter, is provided which comprises a meter base (2) and a meter head (3). The output signal from a transducer in the meter base (2) it processed in the meter head (3) to calculate the utility supply. The processing includes linearization of the signal using calibration data stored in the meter base (2). Therefore, any meter head may be combined with a meter base containing any different type of transducer.

12 Claims, 6 Drawing Sheets

MODULAR UTILITY METER

This application claims the benefit of British Patent Application No. 9912561.9, filed on May 28, 1999.

This invention relates to meters, and is more specifically, but not exclusively, concerned with modular utility meters, particularly water meters.

A wide variety of utility meters are known for measuring the supply of utilities, for example, gas, water and electricity. The measurement of utility supply allows each consumer to be charged according to the level of their use of the supply and discourages wasting of natural resources.

A utility meter comprising, in general, a transducer, processing electronics and a power supply will often have to be completely replaced should any of these parts fail. For example, the moving parts of a mechanical transducer may wear, or the battery power supply will run out.

A utility meter may include a visual display for displaying the current supply reading, and often also includes apparatus for facilitating remote reading, such as an external inductive pad or a radio frequency (RF) module. This apparatus allows the meter to be read without a person having to manually record the reading. Should the reading requirements for the meter change, for example if it becomes desirable to read the meter using RF methods rather than using an inductive pad, then the whole utility meter must necessarily be replaced or physically modified. It is accordingly an object of the present invention to seek to mitigate these disadvantages.

According to a first aspect of the present invention, there is provided a meter comprising first and second detachably connected portions, the first portion comprising a flow measuring transducer and storage means containing data specific to the transducer, and the second portion comprising processing means for processing a flow measurement signal from the transducer and the transducer specific data to produce an output signal representative of flow but independent of transducer characteristics represented in the transducer specific data.

This modular design of the meter allows any transducer to be replaced by any other since any data specific to the transducer will accompany the transducer itself. The signal processing carried out by the processing means will use the transducer specific data which is stored in the storage means.

The processing of the flow measurement signal may involve linearization, thereby using the data to calibrate a non-linear signal into a linear signal.

The meter may be a water meter, in which the transducer will preferably be a flow transducer. More specifically, the flow transducer may be a fluidic oscillator. This type of transducer has the advantage that it is durable because it contains no moving mechanical parts.

The first portion of the meter may conveniently include an amplifier and conditioning electronics. This allows some simple processing of the raw signal from the transducer before the signal is output to the second portion.

A power supply may be provided in the second portion. The second portion may include a liquid crystal display.

The first portion may be made of plastics, specifically PPS (poly phenyline sulphide), and may conveniently include replaceable brass flanges for connection to the resource to be measured. The flanges many be lined or coated by any suitable material to prevent wetted contact between the brass and consumed water.

According to a second aspect of the present invention, there is provided apparatus for use with a meter for transmitting data indicative of the meter reading by radio frequency (RF) transmission comprising a receiver and a transmitter, wherein said receiver is activated periodically, and wherein said frequency of activation of said receiver periodically is increased when the apparatus receives RF transmission originating from compatible RF devices.

The apparatus may preferably transmit the data after receiving RF transmission which includes a signal indicative of a request for the data.

The signal may be unique to the meter.

The apparatus may be detachably connected to the meter.

The apparatus may alternatively be integrally formed within the meter.

According to a third aspect of the present invention, there is provided apparatus for use with a meter for transmitting data indicative of the meter reading, comprising a transmitter for transmitting data on request from a remote receiver, wherein means is provided for transmitting the data at a particular time, the time of transmission identifying the meter to the receiver.

The time of transmission may be determined according to at least one of the meter's identification number and a number generated by a random number generator.

According to a fourth aspect of the present invention, there is provided a meter comprising a flow transducer and means for applying a signal across the normal fluid path and detecting said signal so as to provide an indication of whether fluid is present or not in said fluid oath.

Specific embodiments will now be described, by way of example, with reference to the accompanying drawings, in which.

Figure 1:
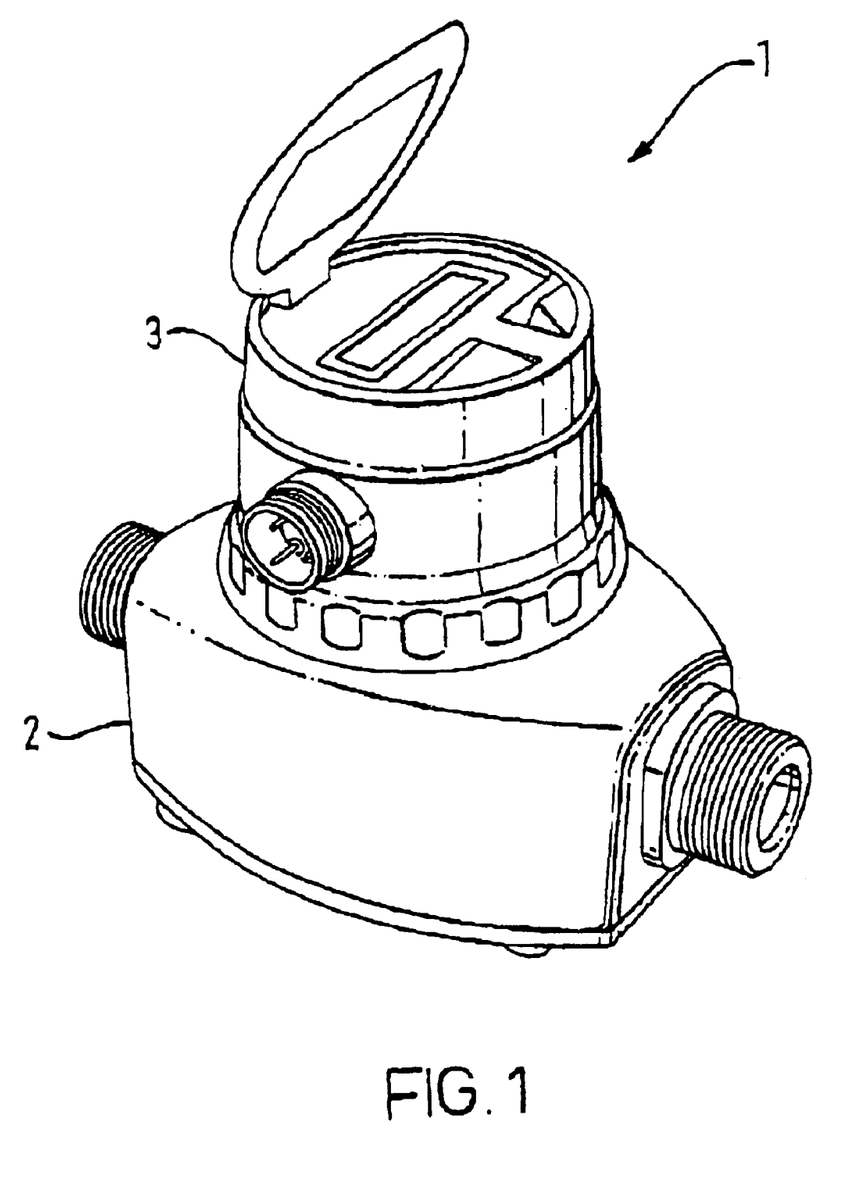
FIG. 1 shows a perspective view of a water meter according to the invention.

FIG. 1 shows a perspective view of a water meter 1 comprising a meter base 2 and meter head 3 (known as a totalizer).

Figures 2, 3:
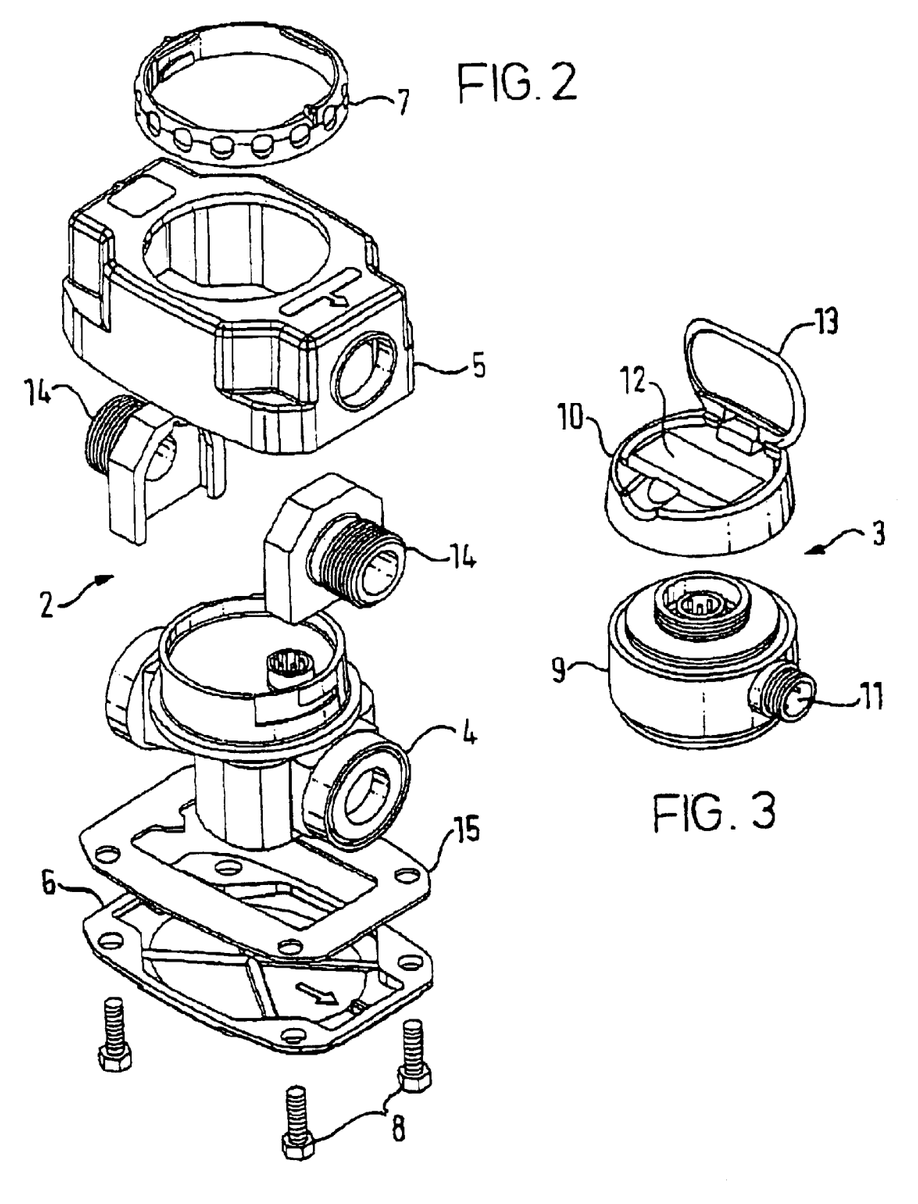
FIG. 2 shows a perspective, exploded view of a modified meter base.
FIG. 3 shows a perspective, exploded view of the meter head of the water meter of FIG. 1.

FIG. 2 shows a perspective, exploded view of a meter base 2 similar to that of the water meter 1 of FIG. 1. The meter base 2 comprises a transducer assembly 4, a PPS (poly phenyline sulphide) body 5, a base plate 6 and a locking ring 7. When the meter base is assembled, the transducer assembly 4 is located within the body 5, and the base plate 6 is fixed to the body 5 using four screws 8. The locking ring 7 is used to hold the meter base 2 and the meter head 3 together. The body 5 includes two brass flanges 14. The flanges 14 may be lined or coated with any suitable material to prevent wetted contact between the brass and the consumed water. A gasket 15 provides sealing of the meter base 2.

FIG. 3 shows a perspective, exploded view of the meter head 3 of the water meter of FIG. 1 The meter head comprises an encoder 9 having an acetyl casing and a display assembly 10. The encoder 9 has a communications port 11 for connection to apparatus (not shown) for facilitating meter reading, such as an inductive pad or RF module. The display assembly 10 has a liquid crystal display 12 for displaying the meter reading, and a hinged protective cover 13. The display assembly 10 and the encoder 9 may be formed as one unit.

Figure 4:
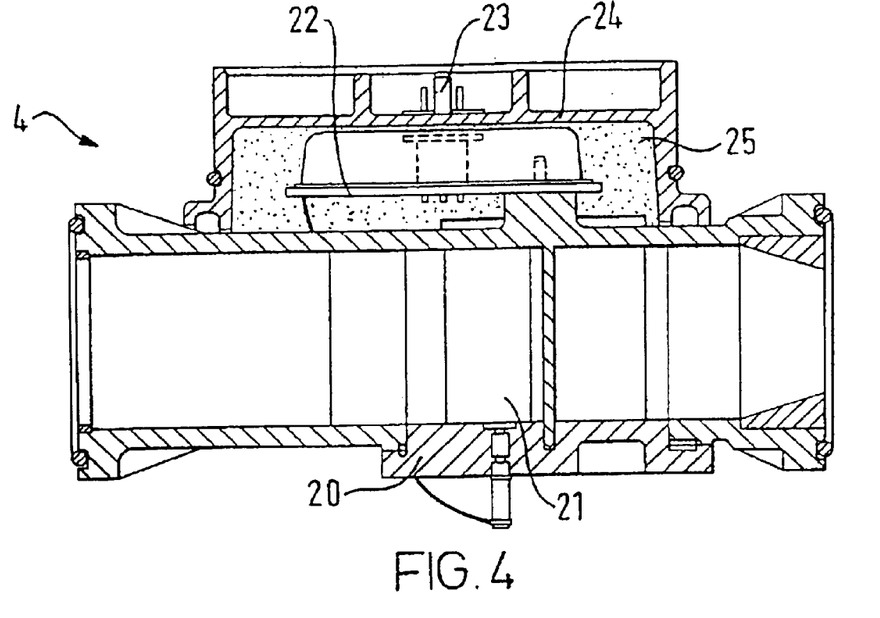
FIG. 4 shows a cross-sectional view of the transducer assembly of the water meter of FIG. 1.

FIG. 4 shows the transducer assembly 4 comprising a flow transducer 20 having a flow chamber 21 with two magnets (not shown). The flow chamber 21 is designed based upon the principles of fluidic oscillation, which is a well-recognised flow sensing technique. The flow chamber is made of PPS (poly phenyline sulphide), a material approved for contact with fluids for human consumption, but could be made of any other suitable material. The transducer assembly 4 also comprises a first printed circuit board (PCB) assembly 22 having an amplifier, conditioning electronics and an EEPROM. A 9-way connector 23 is provided from the PCB 22 to the exterior of the transducer assembly 4. When the water meter is assembled, the connector 23 provides electrical connection from the meter head 3, including power supply, to a corresponding connector on the meter base 2.

A screening can 24 is positioned over the PCB assembly 22, and the PCB assembly 22 and screening can 24 are then encapsulated in polyurethane resin 25.

Figure 6:
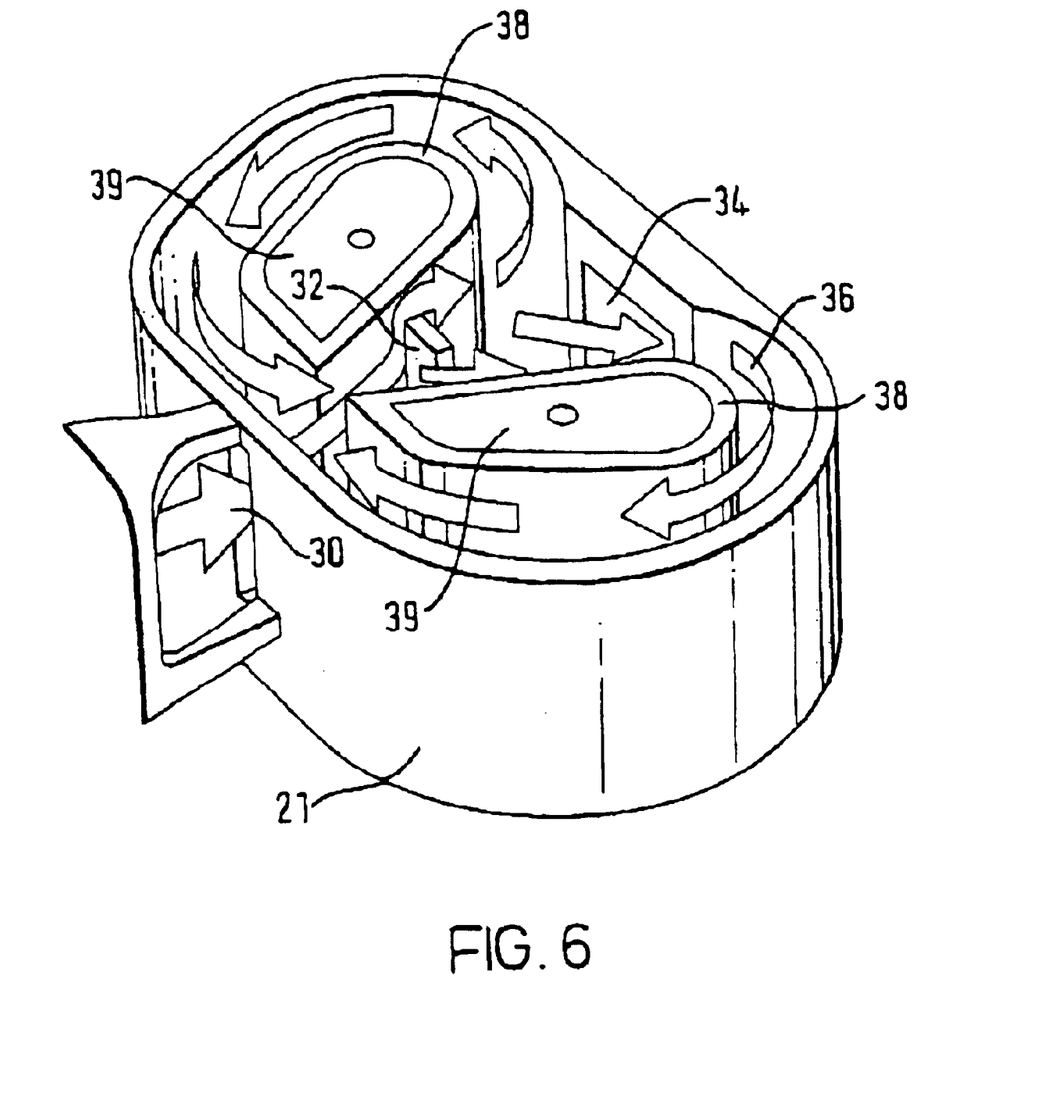
FIG. 6 shows a perspective view of a flow chamber.

A suitable flow chamber 21 is illustrated in FIG. 6. Water enters the flow chamber 21 at an inlet orifice 30. The inlet orifice 30 narrows so as to accelerate water entering the flow chamber 21 into a jet. When the jet enters the flow chamber 21, it is split by splitter post 32. Pressure areas are created on either side of the flow chamber 21 which have the effect of drawing the jet to one side or the other of the chamber 21. Most of the flow will exit the chamber at outlet 34 but a portion will enter one of the feedback loops 36. This flow passes around posts 38 and will return to the area just ahead of the inlet orifice 30, where it will impinge on the jet from the inlet orifice 30, forcing it to the opposite side of the chamber. This cycle is repeated endlessly while flow is present and will oscillate at a frequency proportional to the flow rate through the flow chamber 21. The oscillation is monitored by two pairs of electrodes (not shown) within a magnetic field generated by two magnets 39. The electrodes detect changes in the electromotive force of the jet, and this provides an indication or the flow rate through the meter. A transducer assembly for employing a flow chamber 21 of the type illustrated in FIG. 6 is advantageous because it has no moving parts, and therefore does not wear prematurely. A suitable flow chamber 21 is manufactured by the present applicant.

Figure 5:
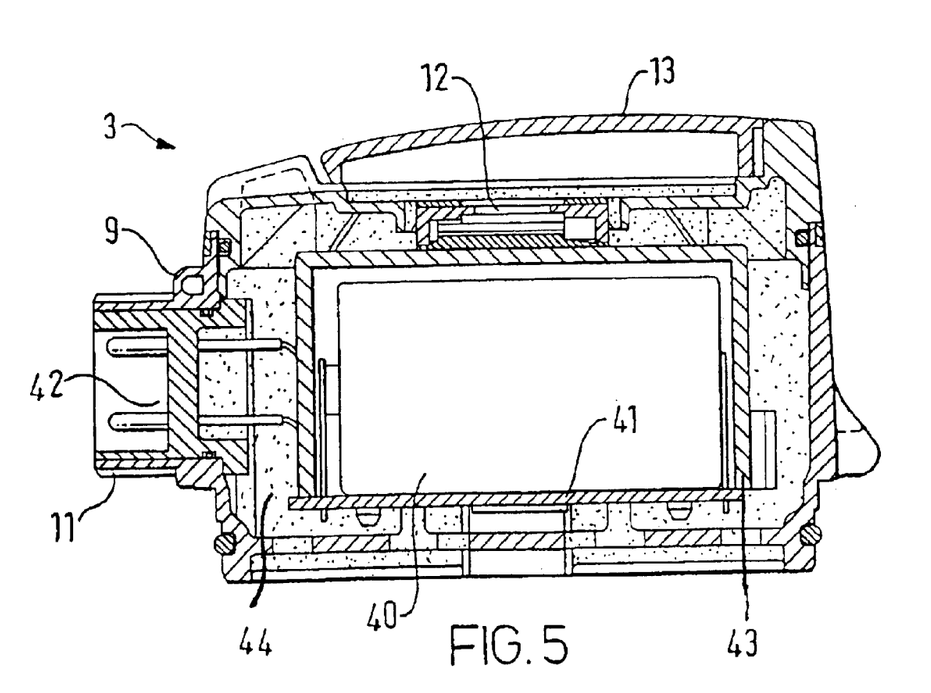
FIG. 5 shows a cross-sectional view of the meter head of the water meter of FIG. 1.

FIG. 5 shows a plan cut-away view of the meter head 3. The encoder a comprises a battery cell assembly 40, and processing electronics are provided on a second PCB assembly 41. The communications port 11 comprises a 3-pin connector 42. A cap 43 is formed over the battery cell assembly 40 and the PCB assembly 41, and polyurethane resin 44 surrounds these components. The battery cell assembly 40 is non-replaceable and is sealed in place during manufacture. This has the advantage that it prevents water leaking in during use, which is a possible drawback for replaceable batteries since in these cases there is necessarily an aperture provided to enable replacement of the battery.

The battery cell assembly 40 powers both the meter head 3 and the meter base 2.

Figure 7:
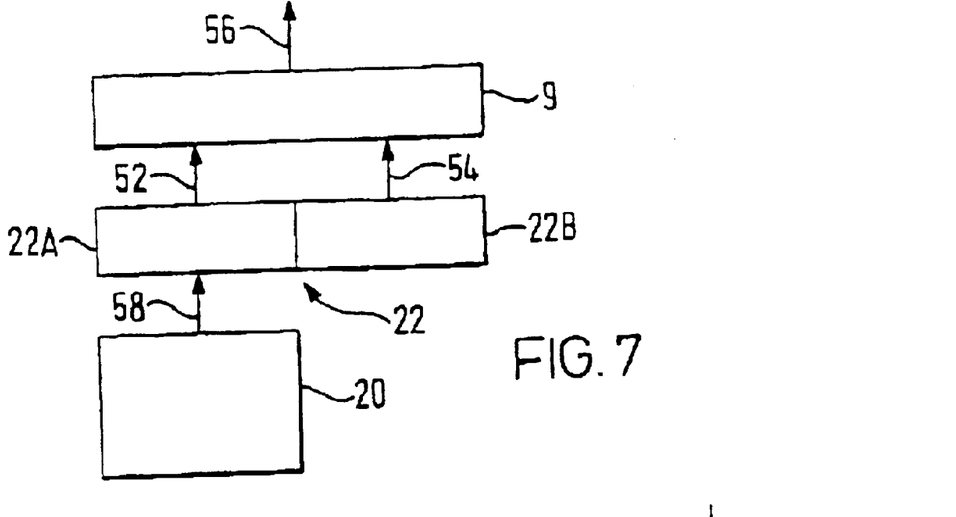
FIG. 7 shows the connections between the components of the water meter.

FIG. 7 is a schematic view showing the connections between the components of the water meter 1. The signal 58 output from the flow transducer 20 is input to amplifying and conditioning electronics section 22A of the PCB assembly 22 of the transducer assembly 4.

Figure 8:
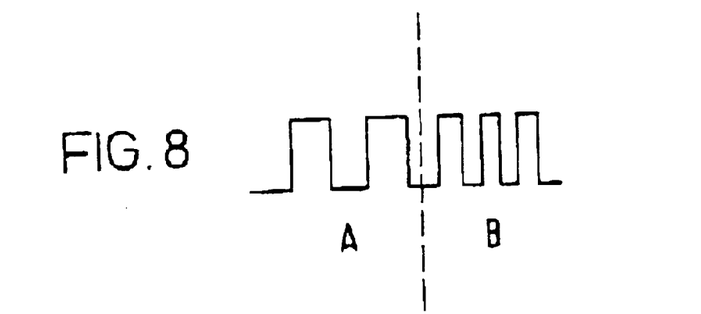
FIG. 8 shows an example output signal from a flow transducer.
Figure 9:
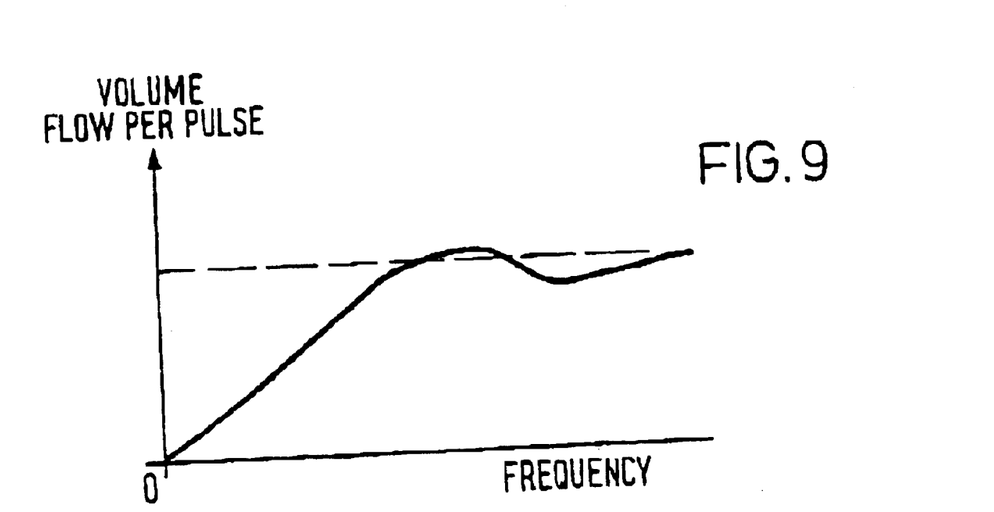
FIG. 9 is a graph showing the relationship between the volume of fluid flow which causes a pulse to be generated against pulse frequency.

An example of a signal output from the flow transducer 20 is shown in FIG. 8. Region A of FIG. 8 shows a pulsed output indicative of a relatively slow rate of flow. Region B of FIG. 8 shows a pulsed output indicative of a relatively fast rate of flow. As the rate of flow increases the frequency of the pulsed output increases. However, the relationship between frequency and flow rate is not entirely linear. FIG. 9 shows a graph which illustrates the relationship between the volume of fluid flow which causes a pulse to be generated against pulse frequency. Ideally, for a linear system, the volume flow per pulse would be the same irrespective of the frequency, as illustrated by the dashed line in the graph of FIG. 9. However, real flow transducers produce a non-linear output. The transducer employed in the present embodiment, at low frequencies, produces a pulse in response to less fluid flow than it does at high frequencies. EEPROM section 22B of PCB assembly 22 contains calibration information specific to the flow transducer in use. This calibration information is derived from the graph in FIG. 9, and is conveniently stored, for example, in the form of a look-up table in the EEPROM.

The lock-up table can be up-dated, for example, if the transducer requires recalibration due to wear, or for any other reason. The base 3 contains a non-volatile memory. This holds the table of calibration data for the flow chamber 21. The flow chamber 21 is a moulded plastics component, small variations in its dimensions that arise from moulding to moulding and from batch to batch result in corresponding small changes in the resulting meter factor (fluid flow rate divided by output frequency) of the flow chamber 21 at different fluid flow rates. For each flow chamber 21 a meter factor characteristic can be drawn, where the changing meter factor is plotted against fluid flow rate or against output frequency. This characteristic is then programmed into the non-volatile memory of the base where it is then available to the linearisation algorithm in the head when the modules are coupled together.

It is possible to re-program the non-volatile memory through the appropriate pins of the 9-way connector between the base and head. This connector is accessible when the two parts are separated. It is useful to be able to reprogram the meter for production re-work purposes and if field re-calibration of a meter is required that is out of specification.

In use, the raw signal from the flow transducer 20 is amplified and conditioned (for example, filtered) in section 22A of the PCB assembly 22 to produce a pulse output 52 for input to the encoder 9 of the meter head 3. Output 54 from the section 22B of the PCB assembly 21 is the look-up table, and this information is also input to the encoder 9. The processing electronics in the encoder 9 processes the pulse output 52 and look-up table output 54 in order to produce a running total output 56 of flow through the meter (the flow accumulation). The information from the EEPROM enables the encoder 9 to correctly interpret the pulsed output 52 so that the flow accumulation output 56 is always accurate, even at low frequencies where the flow transducer 20 does not produce a linear output.

The meter base 2 may be replaced by another meter base which contains a different type or size of transducer. Since the data stared on the ZEROM is specific to the transducer it accompanies, the processing electronics are able to correctly calculate the flow through the meter regardless of the type of transducer.

It may also be desirable to change the meter head which is used with a given meter base 2. For example, it may be desired to replace a meter head capable of driving an inductive pad with a meter head having an integrated RF module. Alternatively, a meter head which records different units of volume may be used.

The meter head (totalizer) 3 has the capacity to record and report run-dry events, detect leaks, detect and report separation of the meter base and head, and allows for the provision of a user-programmable serial number.

The electronic system of the meter applies a common-mode alternative bias signal to the sensing electrodes of the flow chamber 21 through a high source impedance. This signal is of a frequency and waveform that is distinguishable from the differential chamber signal that is caused by fluid flow.

When the flow chamber 21 is filled with the (conducting) liquid, or rather when both sensing electrodes are connected to the reference electrode through the fluid, then the bias signal will be shunted to ground through the relatively low impedance of the path through the fluid.

When the conducting path from either sensing electrode to ground is lost then the bias signal will no longer be shunted to ground. In this case the bias signal will be detected by the electronics system and a dry-chamber event can be registered and acted-upon.

If a run-dry event is detected by the meter hardware, then the software will inhibit flow accumulation while the flow chamber is dry and for a number of seconds afterwards. A counter is incremented each time a run-dry event occurs, and the contents of this counter are output when the meter is read.

A leak event is detected when a period of continuous flow through the meter exceeds a specified time. A counter LEAK-TIME is regularly incremented when water flows through the meter. If flow stops (or a run-dry event is detected) LEAK-TIME will be cleared. Each time LEAK-TIME is incremented it is compared with a stored constant MAX-LEAK-TIME. If LEAK-TIME is greater than or equal to MAX-LEAK-TIME then a leak is deemed to have occurred. A counter is incremented each time a leak event occurs, and the contents of this counter are output when the meter is read.

The meter head 3 also monitors for continuous non-use, which is indicative of the meter being bypassed. This information is also output when the meter is read.

The software detects any separation of the meter head and the meter base by attempting to pass a signal from the meter head 3 to the meter base 2, and detecting whether the signal is received. When separation occurs the meter head 3 ceases normal flow recording. A counter will be incremented each time separation is detected, and the contents of the counter will be output when the meter is read. When the software detects that the modules are reconnected the meter will resume normal flow recording, and the counter will be incremented again. Thus, when reading the meter, an even count value indicates that the modules are connected, and an odd number indicates that the modules are separated.

The totaliser checks regularly the integrity of its critical memory contents by means of a checksum. If the integrity of the contents is lost then the totaliser is shut down with a suitable indication on its display.

All of these "events" are logged internally in the meter head 3. The logged information, can be displayed on display 12 instead of, or in addition to, being output when the meter is read.

A serial number is stored in the meter head 3 which may be programmed through the communications port 11. The serial number is output when the meter is read.

The meter head 3 may be replaced by another meter head with different functionality such as, for example, one which includes a wall mounted LCD, an internal RF module or a data logger, etc. The modular design of the water meter 1 allows any meter head to be combined with any meter base. If a different meter head is required then this may be replaced without incurring the additional expense of simultaneously having to replace the meter base.

The electrical connector of the meter head 3 includes means which detects when a meter base 2 is present. The power to (+V) connector will not become live until a meter base is connected—this prevents moisture on the connector causing electrical damage. When connection first occurs the meter head 3 will check that it is compatible with the meter base, and will give a warning if it is not.

Two of the pins of the 9-way electrical connector that provide the electrical coupling between the meter head 3 and base 2 are dedicated to signalling the presence of the meter base 2 and the head 3. These pins on the head 3 are connected together through a thermistor or through a fixed resistor (not shown), depending on whether the transducer module characteristic needs temperature compensation.

Normally a fixed resistor is used and the corresponding connections on the head 3 are connected one to an output port and one to an input port. When the head 3 tests for the presence of a base 2 it drives the output port high and low and looks for a corresponding signal on the input port. If this happens then the head 3 has detected the presence of a base 2. Otherwise the head 3 knows that a base 2 is not fitted.

If the temperature compensation of the base 2 is required then a thermistor is fitted between the two pins in the base 2. The head 3 contains circuitry that allows the resistance between the two transducer pins to be measured. When a base is connected the head is able to measure the resistance of the thermistor and hence the temperature of the fluid in the flow chamber 21. If a base is not connected the resistance measured will be practically infinite, allowing the head to detect that no base is present. A head so equipped is able to detect the presence or otherwise of a base fitted with a fixed value resistor, thus providing compatibility with different versions of base.

On detection of the coupling of a base the head performs a series of tests on the base electronics. It checks the functionality of the base electronics, checks that transducer is of a version that is compatible with the bead then copies from the non-volatile memory in the base to the memory in the head table containing the flow chamber characteristic. It then performs an integrity check an the data copied from the base memory.

If all of these checks are completed satisfactorily then the fluid metering function is enabled. When flow starts to occur through the flow chamber 21 the meter will start to measure it.

If any of these checks fail then the head continues to behave as if a transducer module is not fitted.

The totaliser continues to check regularly the integrity of its critical memory contents by means of a checksum. This includes the contents that wee copied from the base. If the integrity of this section is lost then the head reverts to behaving as if the base was disconnected. If this happens the metering function is suspended and the memory section that was copied from the base is cleared. If the integrity of the critical head contents is lost then the head is shut down with a suitable indication an its display 12.

The head checks regularly for disconnection of the base. When this happens the metering function is suspended and the memory section that was copied from the base is cleared.

Also, in the event that the communications port 11 malfunctions, the electrical connector of the meter head 3 is configured to be readable so that the serviceability of the meter head 3 can be determined and a meter reading can be obtained.

The meter head 3 has an integrated data logging facility. The device works on a dual logging principle, which means that it logs at both high and low resolution concurrently in two separate data areas in a single memory device.

It stores one year's worth of low-resolution data and also one lunar month of high-resolution data. This data is summarised and made available in the standard reading packet.

The device consists of two separate logging entities;
1. A "low" resolution logger which logs for up to one year @ one sample ever, hour, and
2. A "high" resolution logger which logs for up to twenty-eight days @ one sample every ten minutes.

Both systems log into separate tarts of the same memory device, and they both have a "summary" of the logged data which is included in the standard data packet for this device.

The logger continuously loss at both rates and each memory area rolls over and overwrites its oldest data when full. When the logger is read, the summary data is always transferred. The actual logged data can be read in approximately 5-second blocks, which equate to:
a. one lunar month (twenty-eight days) of low resolution data, or
b. two days of high-resolution data The reading of summary data contained in the standard data packet will be transparent to the meter reader. The reading of main logged data will be initiated by a command sent from a reading probe.

A suitable RF module may be connected to the meter 1 through the communications port 11. The RF nodule will enable the meter to be read remotely using meter reading apparatus having a compatible RF module. A bi-directional RF module for connection to the meter has the following modes of operation. The first mode of operation comprises one-to-one communication. In response to a special RF signal transmitted from meter reading apparatus the RF module will transmit data. For example, the data will only be transmitted if the special signal contains the Identification Number for the meter 1. This mode of operation is required when the meter reading apparatus is interrogating a specific meter. The data transmitted, for this mode and for other modes of operation may include the meter reading, the meter Identification Number and other data indicative of the state of the meter or the utility usage.

The second mode of operation for the RF module comprises mass transmission mode. In response to a generally recognised RF signal transmitted from the meter reading apparatus, the RF module will transmit data. In this mode, all RF modules within range may respond to the mass transmission signal. This allows a "mass transmission speed-read" to be carried out in an area where a large number of meters are located, and is generally useful for vehicle based reading. The responding transmissions from the RF modules may be staggered using time division multiplexing in order to prevent overloading the capability of the meter reading apparatus to receive incoming data. Transmission could be delayed according to each meter's ID number, according to a value from a random number generator, or according to a meter's ID number multiplied by a value from a random number generator.

A third mode of operation, for the RF module involves activity sensing. In general, the RF module comprises a receiver that is activated intermittently, for example every 5 seconds, to attempt to receive transmissions from a meter reader. The receivers are only activated intermittently in order to reduce cower consumption, and thereby prolong battery life (powering up the receiver is the most energy intensive function of the RF module). In activity sensing mode, the frequency of receiver activation is increased, for example to every 0.5 seconds, if meter reading activity is sensed in the local area. The RF module effectively responds to the activity of compatible devices operating in the area, increasing the frequency of receiver activation if the RF transmissions it receives contain a recognised pattern. Thus the RF module is able to respond to an interrogation signal from the meter reading apparatus much faster.

The meter head 3 may be redesigned to include such an RF module, instead of this being provided by an external plug-in RF module via connector through the communications port 11.

Figure 10:
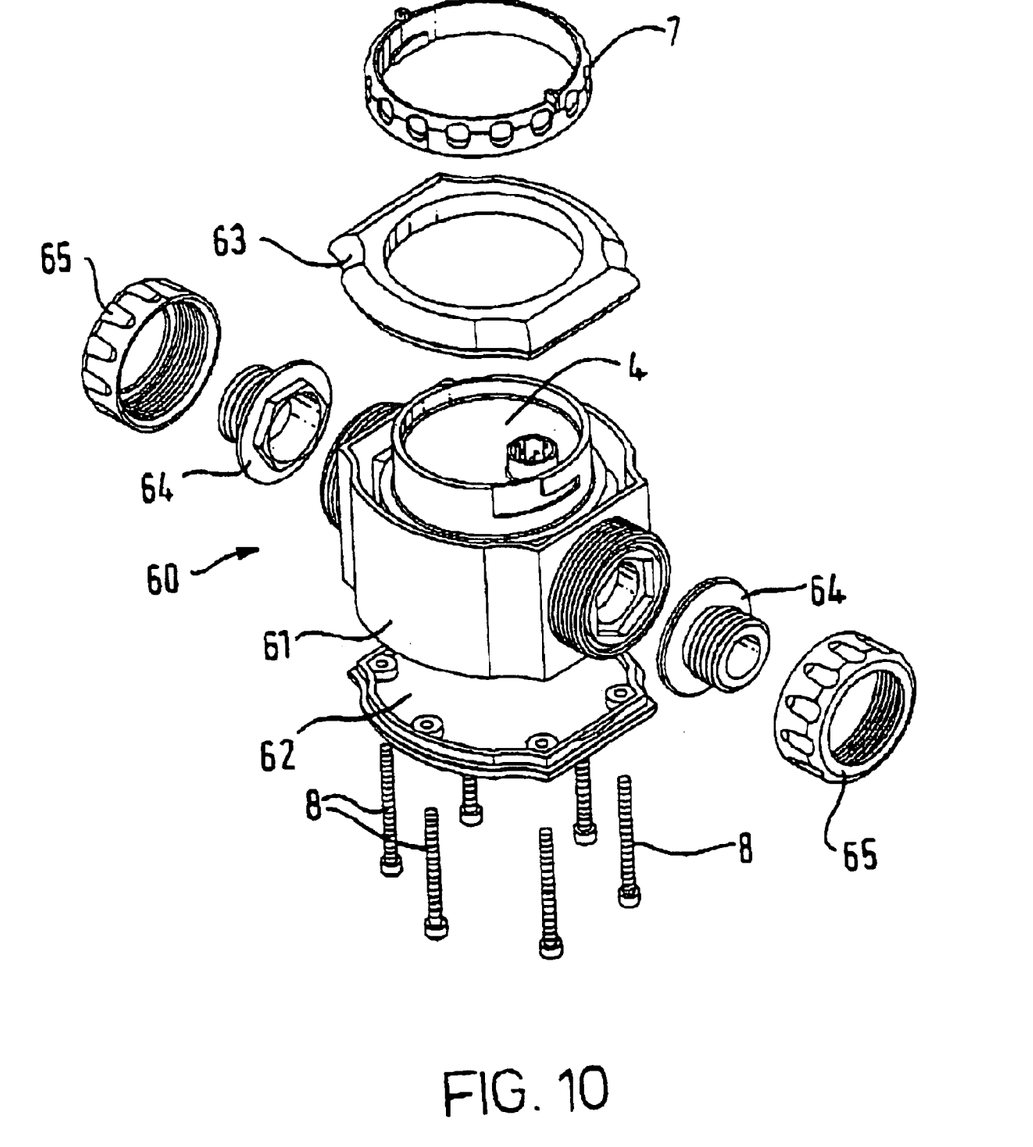
FIG. 10 shows a perspective, exploded view of an alternative meter base for the water meter of FIG. 1.

An example of an alternative meter base 60 which may be used with the meter head 3 is illustrated in FIG. 10. The meter base comprises a transducer assembly 4, a plastics body 61 made of PPS (poly phenyline sulphide), a brass base place 62, a brass top plate 63, a locking ring 7, two brass flanges 64 and two flange locking rings 65. PPS is used in this embodiment because it is generally durable, and is flexible so that it resists cracking when dropped or otherwise abused. However, any other suitable plastics material may be used. The transducer assembly 4 and the locking ring 7 are identical to those provided for the first meter base 2. When the meter base 60 is assembled, the transducer assembly 4 is located within the plastics body 61, the brass base plate 62 is fixed to the plastic body 61 using six screws 8. The brass flanges 64 protrude from the ends of the plastics body 61 and each is held in place using a flange locking ring 65 which has an internal screw thread which co-operates with an external screw thread formed on the plastics body 61. The brass base plate 62 provides rigidity support for the body of the meter base 60. The locking ring 7 is used to hold the meter base 60 and the meter head 3 together.

The formation of the body 61 of plastics (rather than brass) reduces contact between consumed water and brass, and consequently reduces the risk of contaminating the water with lead.

The flanges 64 are made of brass rather than plastics because brass provides a more rigid connector for the water pipes which will be less easily damaged during fitting than plastics. If, nevertheless, the flanges 64 are damaged, they can be removed and replaced. The flanges 64 may be lined or coated with any suitable material to prevent wetted contact between the brass and the consumed water. The small size and simple shape of the flanges 64 allows the coating process to be used. It is not easy to coat larger, more complex structures such as an entire water meter body.

What is claimed is:

1. A meter, comprising:
   first and second detachably connected portions, wherein the first portion includes:
      a flow measuring transducer that produces a flow measurement signal that varies non-linearly with flow rate; and
      storage means containing data specific to the transducer that represents a relationship between the flow measurement signal generated by the transducer and the flow rate measured by the transducer, and the second portion includes:
      processing means for processing the flow measurement signal from the transducer and the transducer specific data to produce an output signal representative of flow but independent of transducer characteristics represented in the transducer specific data, such that the output signal varies substantially linearly with flow rate.

2. A meter according to claim 1, wherein the meter comprises a water meter.

3. A meter according to claim 1, wherein the transducer comprises a fluidic oscillator.

4. A meter according to claim 1, wherein the first portion of the meter includes an amplifier and filter for amplifying and filtering the flow measurement signal from the transducer.

5. A meter according to claim 1, wherein the second portion of the meter includes a power supply for the first and second portions of the meter.

6. A meter according to claim 1, wherein the second portion of the meter includes a display for displaying the meter reading.

7. A meter comprising:
   first and second detachably connected portions, wherein the first portion includes:
      a flow measuring transducer for producing a pulsed output responsive to fluid flow, wherein the frequency of the pulsed output varies non-linearly with the flow rate; and
      storage means containing data specific to the transducer that represents the relationship between the flow measurement signal generated by the transducer and the flow rate measured by the transducer; and the second portion includes:
      processing means for processing the flow measurement signal from the transducer and the transducer specific data using a linearization algorithm to produce an output signal representative of flow but independent of the transducer characteristics represented in the transducer specific data, such that the output signal varies substantially linearly with the flow rate.

8. The meter according to claim 7, wherein the meter comprises a water meter.

9. The meter according to claim 7, wherein the transducer comprises a fluidic oscillator.

10. The meter according to claim 7, wherein the first portion of the meter includes an amplifier and filter for amplifying and filtering the flow measurement signal from the transducer.

11. The meter according to claim 7, wherein the second portion of the meter includes a power supply for the first and second portions of the meter.

12. The meter according to claim 7, wherein the second portion of the meter includes a display for displaying the meter reading.

* * * * *